INVENTOR
John Teufel
By Wayne Lang
AGENT

United States Patent Office  3,095,036
Patented June 25, 1963

3,095,036
THERMAL ACTUATED RADIAL SEAL FOR ROTARY REGENERATIVE HEAT EXCHANGER
John Teufel, Yonkers, N.Y., assignor, by mesne assignments, to Combustion Engineering, Inc., a corporation of Delaware
Filed Apr. 1, 1960, Ser. No. 19,349
3 Claims. (Cl. 165—9)

The present invention relates generally to heat exchange apparatus and particularly it relates to an improved radial sealing arrangement for use between rotor and end plates of a housing enclosing the rotor of a rotary regenerative air preheater.

In rotary regenerative air preheaters of the type herein defined a cylindrical rotor has compartments carrying heat transfer material which are first exposed to heating gases and then as the rotor turns about its axis, the compartments of heat transfer material are exposed to air passing through an air passage to impart absorbed heat to the air. The rotor is surrounded by a housing having end or sector plates formed with openings to provide for the flow of gas and air therethrough. To prevent mingling of the two fluids, radial partitions that form the rotor compartments are provided with radial sealing members that wipe against the imperforate portions of the sector plate.

The present invention is directed to an improved arrangement by which the radial sealing members are imparted substantial freedom of movement completely independent from the thermal distortions of the radial partitions and the particular improvement of the present invention is directed to a thermal actuator for radial sealing means that continuously maintains the sealing means in a sealing relationship with the adjacent sector plate throughout wide variations of thermal distortion of the radial partitions and other rotor structure.

The invention will be more clearly understood upon consideration of the following detailed description of an illustrative embodiment thereof when read in conjunction with the accompanying drawings in which.

Figure 1:
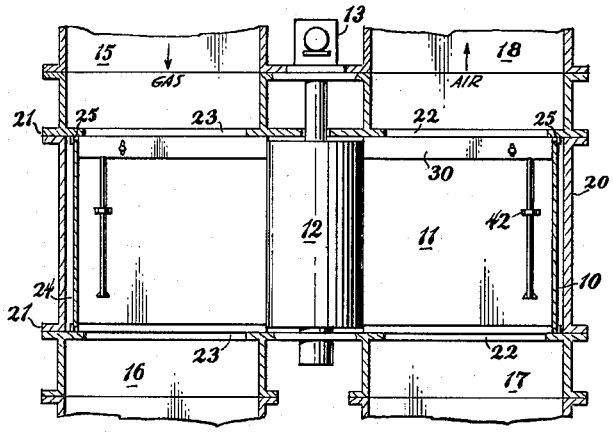
FIGURE 1 is a sectional elevational view in diagrammatic form of a rotary regenerative air preheater.
Figure 2:
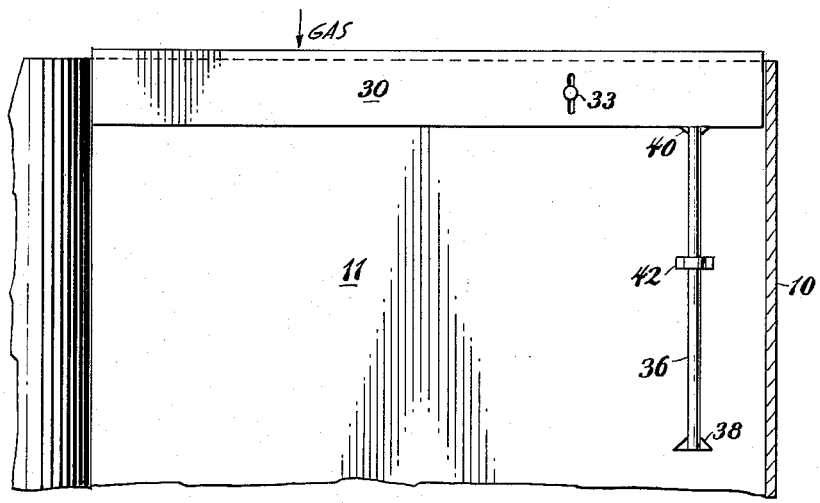
FIGURE 2 is an enlarged fragmentary view showing the relationship between the radial seal and an adjacent radial partition and end plate.

In the drawings the numeral 10 designates the cylindrical shell of a rotor divided into a series of sector shaped compartments by radial partitions 11 connecting it with a rotor post 12 which is turned slowly about its axis by a motor and reduction gearing arrangement 13. The rotor compartments contain regenerative heat transfer material in the form of metallic plates which first absorb heat from hot gases entering the preheater through a duct 15 from a boiler furnace to be discharged after passing over the heat transfer plates through an outlet duct 16 to which an induced draft fan (not illustrated) is connected. As the rotor turns slowly about its axis the heated plates are moved into the stream of air admitted through duct 17. After passing over plates and absorbing heat therefrom, the stream of heat air is conveyed to a boiler furnace or other place of use through a duct 18.

A housing 20 enclosing the rotor 10 is provided at either end opposite the rotor with end or sector plates 21 which are apertured at 22 and 23 to admit and discharge streams of hot gas and cool air flowing through the rotor. In order that the streams of gas and air do not bypass the rotor by flowing through the annular clearance space 24 between the rotor shell 10 and housing 20, it is customary to provide circumferential seals indicated at 25 on the shell 10 to bear against confronting parts of sector plates 21 and seal off space 24 from each end of the rotor.

Radial sealing means 30 are also provided at the end edges of the radial partitions to bridge the space between the partitions and the confronting face of the adjacent end plate.

Radial sealing means at one or both ends of the rotor may be supported independent of the radial partitions in order that thermal distortion or "turn down" of the partition due to uneven heating conditions will not be transmitted to the sealing members to alter the sealing relationship that exists between the sealing means and the adjacent end plate. Sealing means of the type illustrated are commonly termed "cantilever" seals since they are supported only at one end by rotor post 12 and adapted to extend radially therefrom into a spaced relation with the concentric rotor shell 10. Although this type of sealing means may be provided at both ends of the rotor, the usual procedure is to use cantilever seals at the "hot end" of the rotor where the greatest thermal deformation occurs.

Such sealing means provide an effective sealing arrangement for rotary air preheaters of small or modest proportions. However, for large size preheaters that utilize relatively long seals, the outboard ends of the "cantilever" seals 30 tend to droop away from the adjacent end plate and open a leakage path therebetween.

In accordance with the invention therefore, I provide a radial sealing member 30 of the cantilever type that is rigidly secured at its inboard end to the rotor post 12 while its outboard end is yieldingly secured at 33 to the extreme outboard end of each radial partition 11. The extreme outboard end of each radial sealing member 30 is slightly spaced from the inner surface of rotor shell 10 to permit relative movement therebetween. Each sealing member 30 which lies adjacent the inlet for the hot gas at what is commonly termed the "hot end" of the rotor is provided with a variable support adapted to hold it in sealing relation with its adjacent end plate. The variable supports comprise essentially elongate thermally expansive elements 36 having a high coefficient of expansion. These elements are secured at one end 38 to adjacent radial partition 11 while their opposite ends are secured as at 40 to the yieldingly held end of the sealing member 30. A clamp 42 loosely embracing the thermal element 36 is attached to the partition to provide a slidable support therefor. The thermal element 36 is preferably positioned normal to the sealing means 30 to permit the maximum force of expanding element 36 to be applied against the outboard end of the sealing means driving it in the direction of the adjacent end plate 21.

The element 36 is merely representative of a thermal actuator since bi-metallic looped elements, liquid and gas filled elements and other thermally responsive elements are well known in the art. For the purpose of this invention therefore, a thermal element may be considered to be any element that expands readily when subjected to an increase of temperature and otherwise fulfills the requirements specified.

While the claimed actuators have been defined relative to their application at the top of the rotor, it should be clearly understood that thermal actuators of this general type may be readily applied to other movable sealing means regardless of position or arrangement within the air preheater, and it is intended that all matter contained in the above description or shown in the accompanying drawings shall be interpreted as illustrative only and not in a limiting sense.

What I claim is:

1. A regenerative air preheater having a rotor including a cylindrical rotor shell and a central rotor post, radial partitions extending between the rotor post and rotor shell to form a series of sectorial compartments therebetween, a mass of heat transfer material carried by each compartment of the rotor, a cylindrical housing surrounding the rotor, end plates at opposite ends of the rotor housing spaced from adjacent ends of the rotor and provided with imperforate portions between circumferentially spaced apertures that direct a flow of heating gas and air to and through the regenerative heat transfer material carried by the compartments of the rotor, radial sealing means bridging the space between an end edge of each radial partition and its adjacent end plate to preclude fluid flow therebetween, said sealing means comprising radially extending leaf members rigidly secured at their inboard ends to the rotor post and yieldingly secured at their outboard ends to an adjacent radial partition, and thermal actuating means secured between the outboard end of the radial sealing means and the radial partition, said thermal actuating means having a coefficient of expansion greater than that of its adjacent radial partition whereby an increase of temperature will effectively move said sealing means into a sealing relationship with its adjacent end plate.

2. A regenerative air preheater having a rotor including a cylindrical rotor shell and a central rotor post, radial partitions extending between the rotor post and the rotor shell to form a series of sectorial compartments therebetween, a mass of heat transfer material carried by each compartment of the rotor, a cylindrical housing surrounding the rotor, end plates at opposite ends of the rotor housing spaced from adjacent ends of the rotor and provided with imperforate portions between spaced apertures that form inlet and outlet ports to direct a flow of heating gas and air to and through the regenerative heat transfer material carried by the rotor, radial sealing means at the end of the rotor adjacent the inlet port for the heating gas bridging the space between the end of each radial partition and the adjacent end plate to preclude fluid flow therebetween, said sealing means comprising radially extending leaf members rigidly secured at their inboard ends to the rotor post and yieldingly secured at their outboard ends to the adjacent radial partition, and elongate thermal actuating means with a coefficient of expansion greater than that of its adjacent radial partition having one end secured to the radial sealing means lying adjacent the inlet port for the hot gas while the other end of the actuating means is secured to the radial partition at the opposite end of the rotor.

3. A regenerative air preheater as defined in claim 1 wherein the thermal actuating means is positioned normal to the radially extending sealing means to provide maximum support therefor.

References Cited in the file of this patent
UNITED STATES PATENTS

| | | |
|---|---|---|
| 2,670,183 | Hammond et al. | Feb. 23, 1954 |
| 2,674,442 | Hammond et al. | Apr. 6, 1954 |
| 2,874,939 | Rahr et al. | Feb. 24, 1959 |
| 2,911,202 | Trewiler | Nov. 3, 1959 |